(12) United States Patent
Cheah et al.

(10) Patent No.: US 9,784,279 B2
(45) Date of Patent: Oct. 10, 2017

(54) ZERO RIPPLE FAN NOISE SUPPRESSION

(71) Applicant: NATIONAL INSTRUMENTS CORPORATION, Austin, TX (US)

(72) Inventors: Chin-Hong Cheah, Penang (MY); Chuen-Ming Tan, Penang (MY)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

(21) Appl. No.: 15/045,723

(22) Filed: Feb. 17, 2016

(65) Prior Publication Data

US 2017/0234317 A1    Aug. 17, 2017

(51) Int. Cl.
G05F 1/62 (2006.01)
F04D 25/06 (2006.01)
F04D 29/58 (2006.01)
F04D 29/66 (2006.01)

(52) U.S. Cl.
CPC ........... F04D 25/06 (2013.01); F04D 29/584 (2013.01); F04D 29/661 (2013.01)

(58) Field of Classification Search
CPC ....... G01R 19/0084; G05F 1/62; G05F 1/563; B64G 1/443; H02M 3/156; H02M 3/1588; H02M 2001/007; H02M 2001/0045; Y02B 70/1466
USPC ................ 323/234, 266, 271, 282
See application file for complete search history.

(56) References Cited

U.S. PATENT DOCUMENTS

| | | | | |
|---|---|---|---|---|
| 4,496,829 A | * | 1/1985 | Black | G05B 11/28 219/216 |
| 7,024,254 B2 | * | 4/2006 | Salsbury | G05B 5/01 307/141 |
| 7,247,996 B2 | * | 7/2007 | Morishita | H02M 1/4225 315/224 |
| 2003/0198063 A1 | * | 10/2003 | Smyth | H02M 3/33507 363/21.1 |
| 2007/0253162 A1 | * | 11/2007 | Naghi | F04D 25/166 361/695 |
| 2012/0092799 A1 | | 4/2012 | Wu | |

* cited by examiner

*Primary Examiner* — Yemane Mehari
(74) *Attorney, Agent, or Firm* — Meyertons Hood Kivlin Kowert & Goetzel, P.C.; Jeffrey C. Hood; Bradley M. Parro (57) ABSTRACT

A fan noise suppression circuit may be coupled between a power source and a power input to at least one fan. The fan noise suppression circuit may include an adjustable current source coupled to the power source. The adjustable current source may provide a voltage output and a current output based on a power output of the power source. The fan noise suppression circuit may include a feedback controller coupled to an output of the adjustable current source. The feedback controller may be configured to compare the voltage output to a reference voltage and provide an error value to the adjustable current source, wherein the adjustable current source may adjust the current output based on the error value.

17 Claims, 6 Drawing Sheets

| Inductor | Measured Inductance | Capacitance | Ripple Current (A) | Attenuation Percentage (%) (Compared to Input) |
|---|---|---|---|---|
| CMX1211W132 | 5.85mH | 10mF | 2.52 | 84.00 |
|  |  | 20mF | 1.92 | 64.00 |
|  |  | 30mF | 1.48 | 49.33 |
|  |  | 40mF | 1.00 | 33.33 |
| CMX1211W182 | 7.7mH | 10mF | 2.44 | 81.33 |
|  |  | 20mF | 1.52 | 50.67 |
|  |  | 30mF | 1.28 | 42.67 |
|  |  | 40mF | 0.88 | 29.33 |
| CMX1211W132 | 10.85mH | 10mF | 2.20 | 73.33 |
|  |  | 20mF | 1.40 | 46.67 |
|  |  | 30mF | 1.00 | 33.33 |
|  |  | 40mF | 0.88 | 29.33 |
| CMX1211W132 | 5.85mHx2series | 10+10mF | 1.64 | 54.67 |
|  |  | 20+20mF | 1.10 | 36.67 |
| WE | 22.3mH | 10mF | 1.52 | 50.67 |
|  |  | 20mF | 0.94 | 28.00 |
|  |  | 30mF | 0.56 | 18.67 |
|  |  | 40mF | 0.48 | 16.00 |

Note: Input is a 500Hz, $3A_{pp}$ square current

10V/20A Constant Current, Constant Voltage Step-Down Converter

FIG. 8

ZERO RIPPLE FAN NOISE SUPPRESSION

FIELD OF THE INVENTION

The present invention relates to cooling equipment for electronic systems, e.g., fans, and, more particularly, to mitigating power rail contamination by a rotating fan load.

DESCRIPTION OF THE RELATED ART

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures.

However, the load presented by a rotating fan can result in power supply contamination. Therefore, improvements in the field are desired.

SUMMARY OF THE INVENTION

According to some embodiments, a fan noise suppression circuit may be coupled between a power source and a power input of at least one fan. The fan noise suppression circuit may be configured to provide power to the at least one fan. In providing power to the at least one fan, the fan noise suppression circuit may be configured to draw constant current from the power source. In other words, the input of the fan noise suppression circuit may present a constant current load to the power source. The fan noise suppression circuit may be configured to provide constant average power to the at least one fan. The fan noise suppression may include a filter circuit (e.g., an LC filter) configured to reduce voltage noise seen by the fan noise suppression circuit.

In some embodiments, the fan noise suppression circuit may include an adjustable current source coupled to the power source (or, alternatively, coupled to an output of the filter circuit). The adjustable current source may provide an output current based on a power seen at an input of the adjustable current source (e.g., based on a power output of the power source or based on a power output of the filter circuit). The adjustable current source may provide the average power drawn by the fan based on the power required by the fan or based on a command to a certain power level by an external source. The adjustable current source may generate an output power that may be provided to the power input of the at least one fan. The fan noise suppression circuit may include one or more delay elements and/or energy storage elements (e.g., a capacitor) coupled to the output of the adjustable current source. The one or more delay elements and/or energy storage elements may be operable to provide a delay in operation of feedback controller.

The fan noise suppression circuit may include a feedback loop (e.g., a feedback controller coupled to the output of the adjustable current source). The feedback controller may be configured to compare the output of the adjustable current source to a reference voltage and to provide an error value to the adjustable current source. The adjustable current source may be configured to adjust the output current based on the received error value. The feedback controller may be configured to maintain the output current of the adjustable current source at a substantially constant value. Thus, the power input of the at least one fan may draw a substantially constant current and power. The feedback controller may include a proportional integral derivative (PID) controller.

The fan noise suppression circuit may include a boost regulator, a buck regulator, or a boost buck regulator, depending on the requirements of the output. The regulator may be coupled to the output of the adjustable current source. A boost regulator may be configured to increase a voltage at the power input of the at least one fan to meet the voltage required by the fan load. The boost regulator may allow a higher peak to peak voltage ripple to be seen at delay element. A buck regulator may be configured to decrease a voltage at the power input of the at least one fan.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note that the headings are for organizational purposes only and are not to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "coupled" means "directly or indirectly connected."

DETAILED DESCRIPTION OF THE INVENTION

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field. Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected icons, wherein the plurality of interconnected icons visually indicate functionality of the program. The interconnected icons are graphical source code for the program. Graphical function icons may also be referred to as blocks.

The following provides examples of various aspects of graphical programs. The following examples and discussion are not intended to limit the above definition of graphical program, but rather provide examples of what the term "graphical program" encompasses:

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™ VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or icons are often referred to as the block diagram portion of the graphical program.

Data Flow Program—A Software Program or a Hardware Configuration Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected icons (blocks), wherein at least a subset of the connections among the icons visually indicate that data produced by one block is used by another block. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with blocks in the graphical program. For example, when Input Controls and Output Indicators are created in the GUI, corresponding blocks (e.g., terminals) may be automatically created in the graphical program or block diagram. Alternatively, the user can place terminal blocks in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the HMI (Human Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism," where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Optimization—refers to the technical process of determining or selecting a best or improved element or configuration from a set of available alternatives with regard to some specified criteria (e.g., an objective function, and possibly constraints), and generally within some specified tolerance. Note that in practical use, an optimized system (or process) is improved (with respect to specified criteria), but may or may not be the absolute best or ideal solution. Said another way, optimization operates to improve a system or process, and may approach the mathematically optimum solution to within some tolerance, which may be dependent on the application, e.g., within 1%, 2%, 5%, 10%, etc., of the mathematically optimal solution. Thus, as used herein, the terms "optimized", "optimum", and "optimal" mean "improved with respect to specified criteria".

Global Optimization—refers to a type of optimization in which a system or process with interdependent components or sub-processes is improved by varying multiple parameters or aspects of the system or process at the same time, generally with non-linear results. Note that ideal global optimization (finding the mathematically globally optimum solution) is generally intractable, because in even moderately complex systems and processes there are many more possible configurations and resulting behaviors than can be searched or considered in a reasonable amount of time. Thus, practically, global optimization operates to improve a complex system or process by varying multiple parameters concurrently, and may approach the mathematically globally optimum solution to within some tolerance, which may be dependent on the application, e.g., within 1%, 2%, 5%, 10%, etc., of the mathematically globally optimal solution. Thus, as used herein, the terms "globally optimized," "globally optimum," and "globally optimal" mean "globally improved with respect to specified criteria." One example of a global optimization method is differential evolution, which optimizes a problem (system or process) via iterative improvement of candidate solutions with respect to some specified measure of quality.

Peripheral Device—refers to a device connected over a network to a computer. A computer may be communicatively coupled (e.g., connected via a wired connection or connected via a wireless connection) to any number of peripheral devices. One or more of the peripheral devices may be an expansion chassis, which may further be communicatively coupled to other peripheral devices. A computer may be communicatively coupled to a number of peripheral devices of a like-kind and/or to a number of peripheral devices of different types. In one example, a number of expansion chassis may be communicatively coupled to each other (e.g., a first expansion chassis may be "daisy-chained" to a second expansion chassis and so on). A peripheral device may also house a port that allows a second peripheral device to be communicatively coupled thereto.

Transient—refers to a rapid change over a short duration. A transient may refer to a voltage transient, a current transient, a transient in transferred energy, or the like. The term "transient" is used interchangeably with the terms "ripple" and "spike."

In some fan system embodiments, the power source or power rail that provides power to a fan may become contaminated by the rotating fan load. In some current applications, very powerful fans may be used to achieve a larger amount of cooling capacity as compared to previous applications. For example, in some current chassis applications it may be desirable to achieve 52 W per slot of cooling capability. These applications may use brushless fans that utilize hard switching internally to control their rotation and commutation. These fans may produce high current transients of greater than 12 As in the frequency range of several hundred hertz (500 Hz may be typical at full speeds), and thus they are not easily filtered by passive methods and are just beyond reasonable attenuation by the power supply transient response.

A power supply control loop may be used to attempt to reduce this transient current effect on the power supply output voltage. However, depending on the loading condition and design of the power supply, the power supply control loop may not have sufficiently low output impedance at these frequencies (e.g., around 500 Hz) to suppress the voltage effects. Furthermore, a power supply may need to be designed to various specification targets; output impedance at a particular frequency may depend on one or more of these parameters, but the designer of the power supply may not design the power supply for a target output impedance at the particular frequency. Furthermore, the output impedance may not be a particularly tightly controlled parameter, which may result in variations between units. Architecture wise, these variations may make the design power supply model-dependent. As a result of these concerns, controlling and/or reducing the output impedance of the power supply may not be a practical solution, particularly at these frequencies (e.g., around 500 Hz).

The table below shows effects of the 500 Hz, 12 A peak currents on different power supplies and the induced voltage noise on the output voltage rails. Note that the output impedance may significantly increase when the operation mode changes for a power supply at light load.

| Power Supply | Impedance at 500 Hz | Induced Voltage Noise on Voltage Rail (12 A peak fan currents) |
| --- | --- | --- |
| PS231A (900 W) DS_PXIE-1095 (1200 W) | 4 mΩ | 48 mVpp |
| Full Load | 15 mΩ | 180 mVpp |
| Very Light Load (sync rectifiers offline) | 20 mΩ | 240 mVpp |

Figure 1:
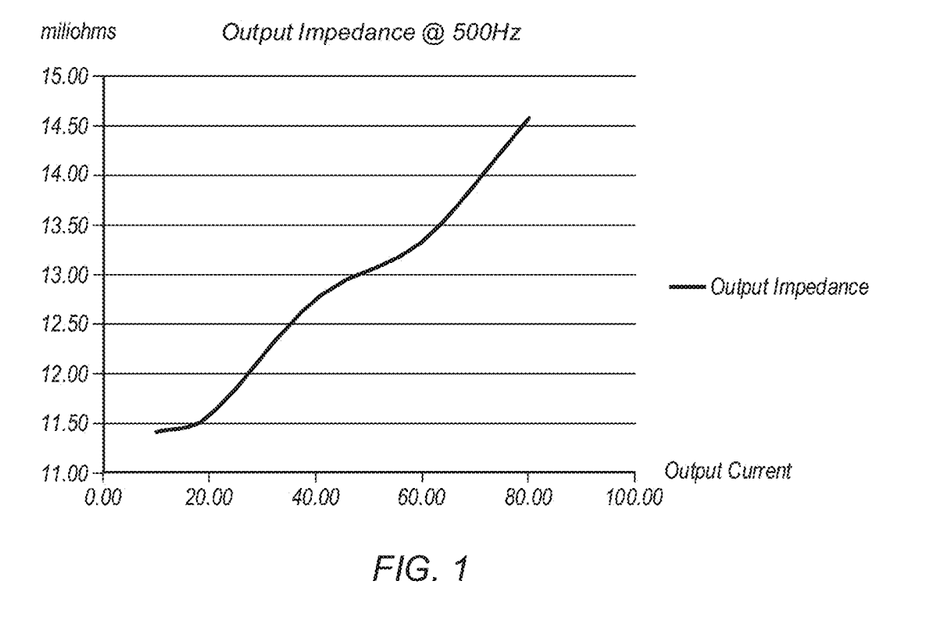
FIG. 1 illustrates a graph of variations in output impedance with loading conditions, according to some embodiments.

FIG. 1 illustrates a graph that demonstrates output impedance variations with loading conditions, according to some embodiments. FIG. 1 shows that output impedance may increase with static load currents. The increase of output impedance increasing with static load currents as shown in FIG. 1 may translate to worse voltage noise (i.e., increased voltage noise) due to fan current ripple as the power supply load is increased.

Figure 2:
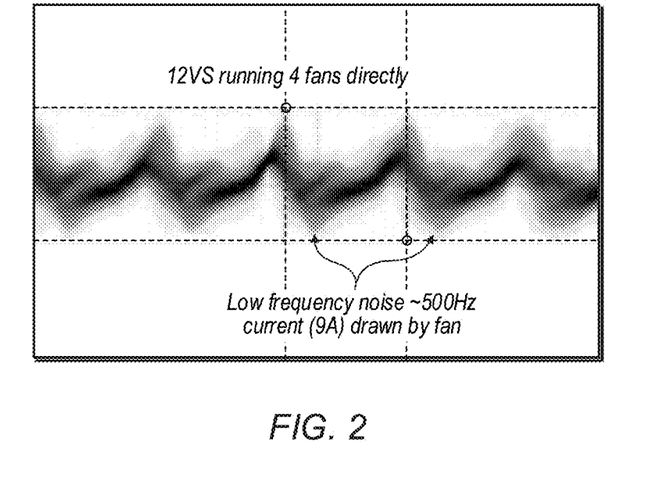
FIG. 2 illustrates a screenshot of an oscilloscope that indicates voltage noise resulting from a power supply directly running a number of fans.
Figure 3:
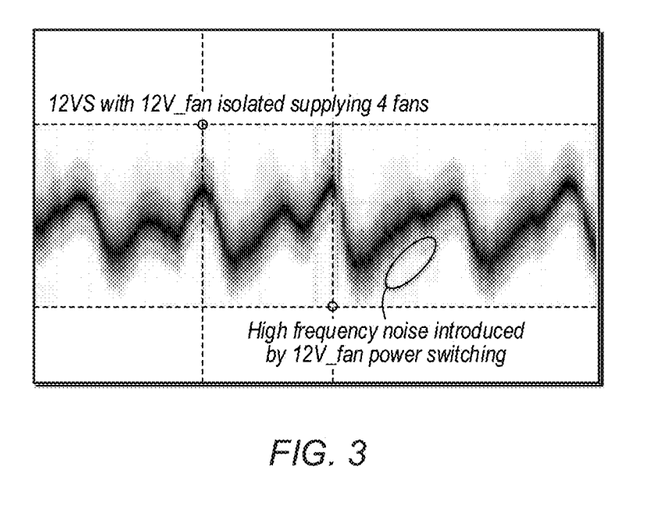
FIG. 3 illustrates a screenshot of an oscilloscope that indicates voltage noise resulting from an isolated fan power supply running a number of fans.

FIGS. 2 and 3 illustrate that the high switching current transients may introduce significant voltage noise on the power supply rail that the fan is sitting on. FIG. 2 illustrates the effects on a voltage supply rail (e.g., a 12V rail of a PXIe Chassis) of the voltage supply rail directly running a number of fans. In other words, the power draw from the fans may induce power contamination (e.g., noise) in the voltage supply line. In some embodiments, this power contamination may include low frequency noise (e.g., approximately 500 Hz) when current is drawn by the fans (e.g., approximately 9 A). Because the voltage supply may be a common rail for a chassis (e.g., the voltage supply may also provide power to any peripherals attached to the chassis), the power contamination may be seen by any peripheral that is plugged into the chassis.

FIG. 3 illustrates the effects on a voltage supply rail in some embodiments with a fan power supply isolated from the power rail (e.g., a 12 V fan power supply isolated from a 12 V rail of a PXIe Chassis). Previously, this induced contamination was at least partially solved by isolation of the fan power supply with an isolated power and passive filtering. However, even when isolated from the common voltage rail, the fans may induce power contamination in this voltage rail. In some embodiments, this power contamination may include high frequency noise induced by power switching from the isolated fan power supply. In other words, the oscilloscope screenshot illustrated in FIG. 3 shows that the isolated power supply may not solve the power rail contamination problem, and may rather make it worse.

Figure 4:
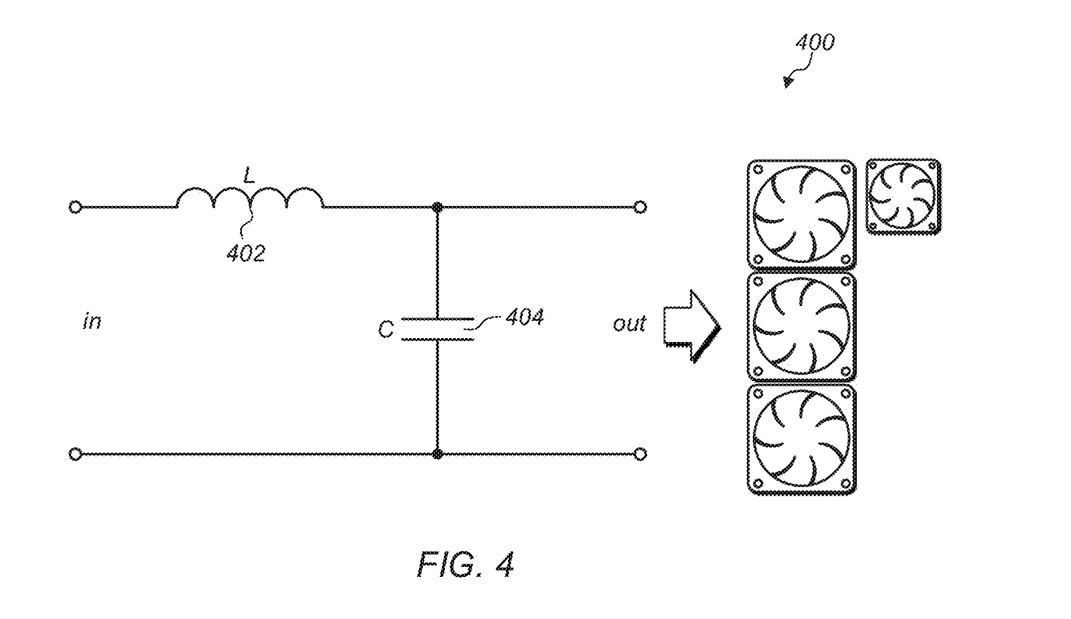
FIG. 4 illustrates an example of a passive LC filter, according to some embodiments.

FIG. 4 illustrates an example of a passive LC filter, according to some embodiments. In some embodiments, a passive LC stage that follows a power supply to further suppress the current transients may be used to mitigate the induced contamination problem described above. This method may also be referred to as "brute force filtering." An example of a passive LC stage is illustrated in FIG. 4, according to some embodiments. The values of inductor 402 (L) and the capacitor 404 (C) may be varied according to the requirements of the passive LC stage filter. That is, an increase in the inductor L may reduce the slew rates (that is, the rate of change of voltage per unit time) seen by the power supply unit. An increase in the capacitor C may mitigate the ripple voltage seen by the fans.

In previous implementations, brute force filtering may work to decrease power rail contamination to a limited degree (e.g., in embodiments in which the fan power draw and current transients are small, such as in an older PXI chassis). However, in scenarios that require an increase in cooling performance (e.g., in the next generation of a PXIe chassis that may be utilizing very powerful fans), the prior methods may need very large parts (e.g., very large capacitors and/or inductors) to reduce the fan induce voltage noise to a similar level as the previous PXIe chassis.

Figure 5:
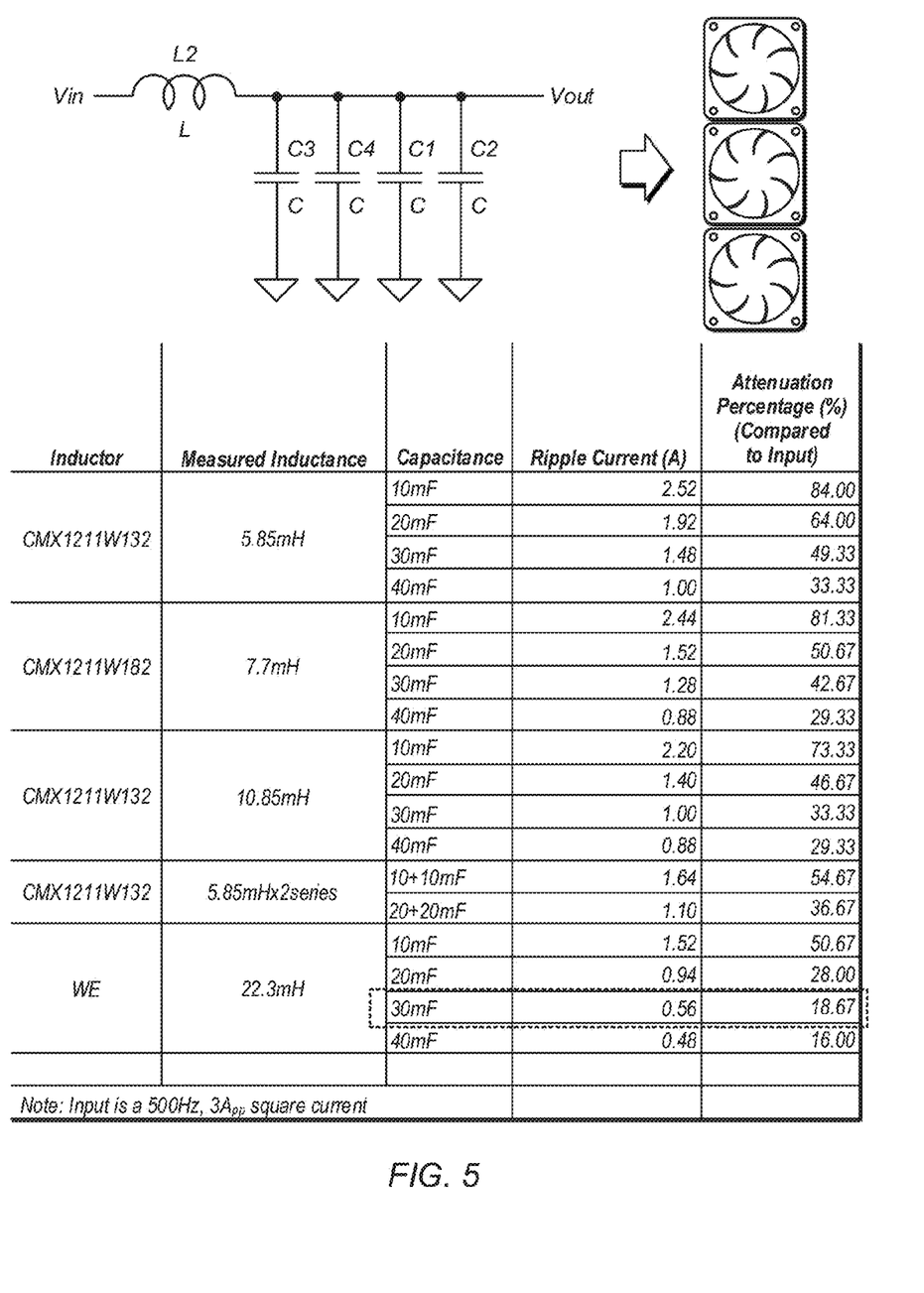
FIG. 5 illustrates a chart of various sizes of capacitors and inductors required to achieve a given attenuation, according to some embodiments.

FIG. 5 illustrates a chart of various sizes of capacitors and inductors required to achieve a given attenuation, according to some embodiments. In other words, the chart in FIG. 5 shows the relative sizes of parts that may be needed for a reasonable ripple attenuation based on the power requirements of such next generation chassis fans. The illustrated chart indicates that to achieve attenuation of the output current ripple to 16% of the input would require a 22.3 mH inductor and a 40 mF capacitor. A target maximum voltage noise on the voltage rail may be 40 $mV_{pp}$. This target maximum may require a 2.67 $A_{pp}$ maximum current. Assuming that a fan that runs on 12 $A_{pp}$ need attenuation to 22.3% (that is, the ripple current must be less than 2.67 A*22.3%), then the resulting LC stage filter would require an inductor with a value of 22.3 mH and a capacitor with a value of 30 mF, as indicated by the red box in FIG. 5. These values indicate substantial inductance and capacitance that may not be feasible to implement.

In other words, a passive LC stage filter with reasonably sized components may not be sufficient to reduce voltage noise to allowable levels. This may be because 40 $mV_{pp}$ of voltage noise may not be enough (that is, we may want even better specifications for a next generation chassis) and because if L increases, C also needs to increase due to the need to store more energy and because the "recharge rate" may slow down due to the large inductance in the LC filter.

Figure 6A:
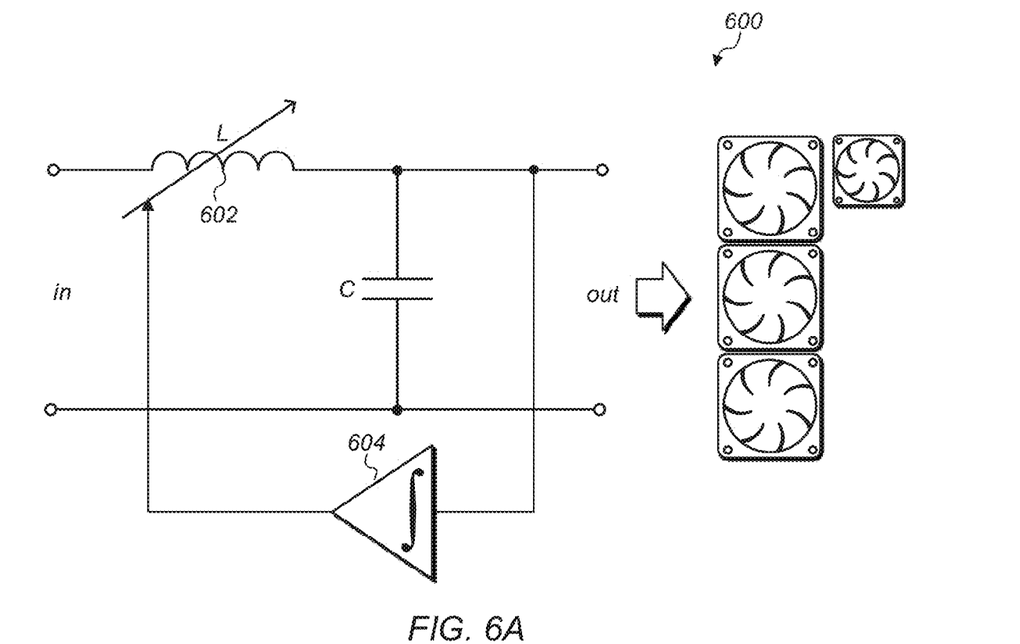
FIG. 6A illustrates an example of a fan noise suppression circuit, according to some embodiments.

FIG. 6A illustrates an example of a fan noise suppression circuit, according to some embodiments. The above problems may be addressed with use of a modified LC filter as depicted in fan noise suppression circuit 600 (e.g., a circuit that uses a variable inductor and a feedback controller, as explained below). A variable inductor in an LC filter, such as variable inductor 602, may be configured to have a very large value during steady state operation and may be adjusted to a smaller value to support transients and ramp ups (or recovery). The variable inductor may be dynamically adjusted via a very slow feedback loop, such as feedback loop 604. The feedback loop may be made slower so that it may adjust the variable inductor to different values in order to maintain the low input ripple at steady state operation and to balance the amount of ripple that may be allowed at the output versus the amount of ripple at the input (that the input power rail can attenuate successfully). In other words, such a feedback loop with a variable inductor may allow the inductance to be reduced when the system ramps up to its steady state and when the fan speed and/or power may need to be adjusted.

Figure 6B:
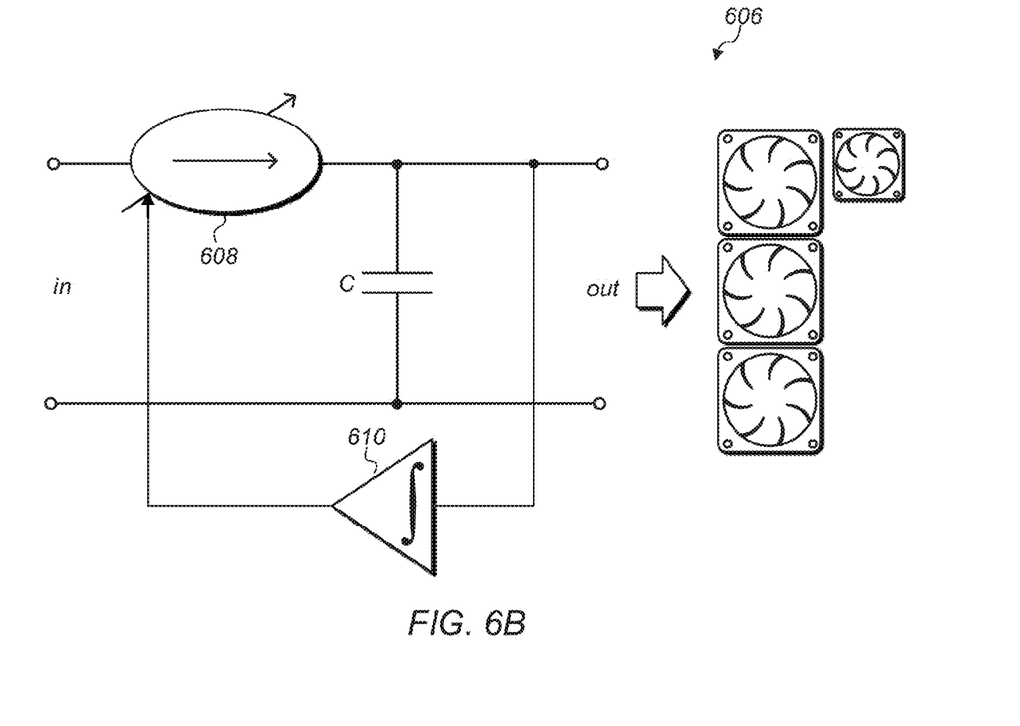
FIG. 6B illustrates an example of a fan noise suppression circuit, according to some embodiments.

FIG. 6B illustrates an example of a fan noise suppression circuit, according to some embodiments. Note that because the utility of the variable inductor having a large value at steady state is to enable the variable inductor to behave as a current source, an adjustable current source may be used in place of the variable inductor, as shown in fan noise suppression circuit 606. In other words, when the fan or the load is operating at steady state, the fan or load is also drawing a constant power. The fan noise suppression circuit shown in FIG. 6 illustrates variable current source 608 and feedback controller 610. The feedback loop (e.g., using feedback controller 610) described above may be used to slowly maintain equilibrium such that the input is drawing a constant current and power. The output may draw high current ripples provided that that, in the control time constant of the control loop, the output maintains an average power draw that is constant. Note that the input power supply to the LC filter may see a constant current load (that is, will see zero ripple voltage in the input rail).

Figure 7:
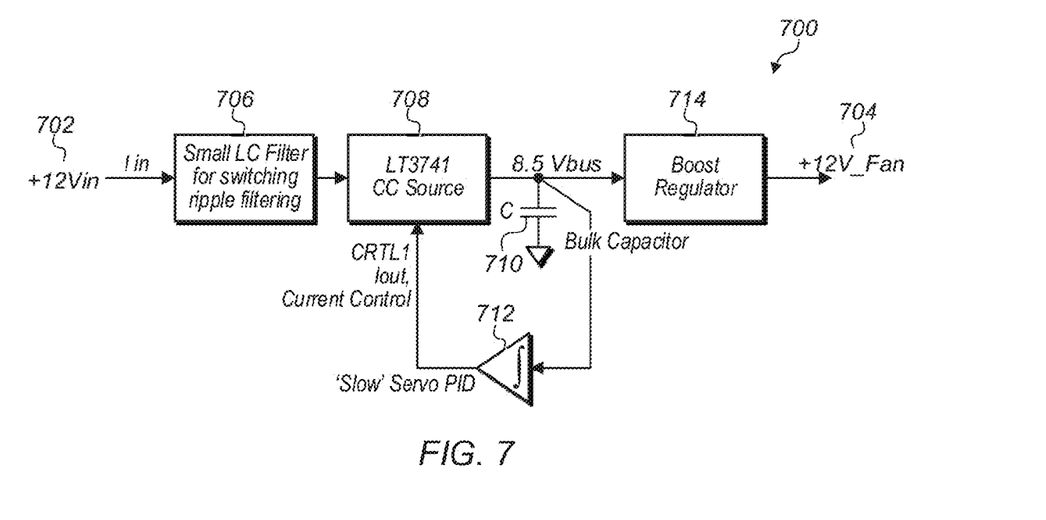
FIG. 7 illustrates an example of a fan noise suppression circuit, according to some embodiments.

FIG. 7 illustrates an example of a fan noise suppression circuit, according to some embodiments. In some embodiments, fan noise suppression circuit 700 may see an input voltage from power source 702 (e.g., a +12V power rail). The fan noise suppression circuit may be coupled between power source 702 and power input 704 of at least one fan.

The input voltage may provide a current input, $I_{in}$, to an input of the fan noise suppression circuit. The input of the fan noise suppression circuit may be coupled to power source 702. The input of the fan noise suppression circuit may present a constant current load to power source 702. In other words, the fan noise suppression circuit may be configured to provide power to the at least one fan. In providing power to the at least one fan, the fan noise suppression circuit may be configured to draw constant power from the power source and to cause the at least one fan to draw constant average power. In other words, the fan noise suppression circuit may be configured to provide constant average power to the at least one fan.

In some embodiments, the fan noise suppression may include filter 706 (e.g., an LC filter). Filter 706 may be configured to reduce voltage noise seen by the fan noise suppression circuit (e.g., by filtering switching ripple from power source 702). In other words, filter 706 may operate to reduce ripple noise received by an adjustable current source. Filter 706 may have components (e.g., an inductor and a capacitor) with smaller values than those discussed above with respect to FIG. 5. In other words, filter 706 is not intended to provide full fan noise suppression.

Figure 8:
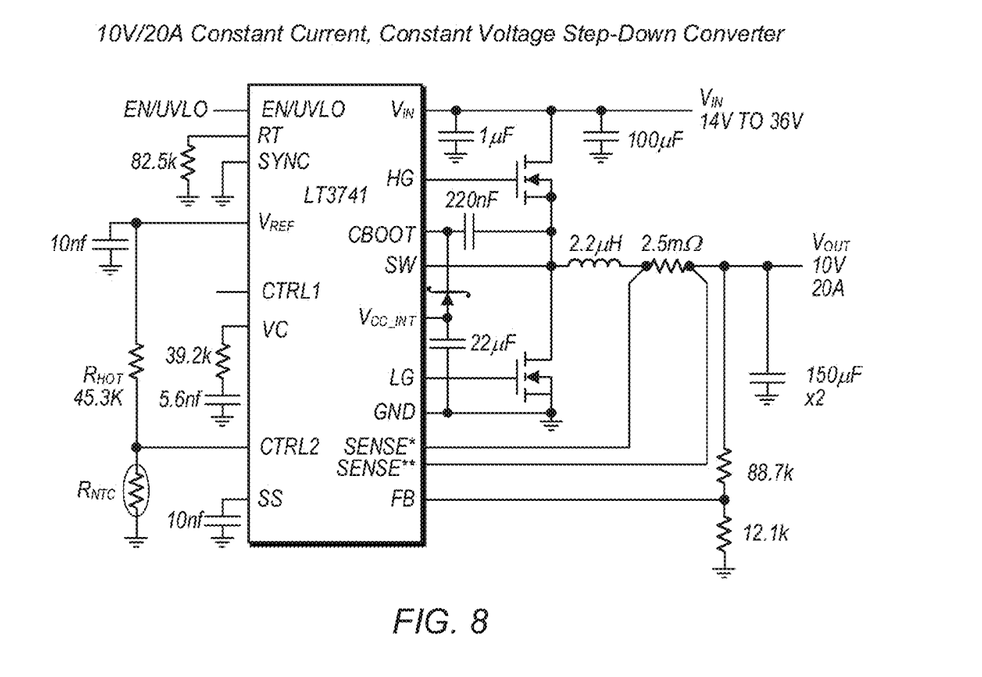
FIG. 8 illustrates an example of an adjustable current source, according to some embodiments.

In some embodiments, the fan noise suppression circuit may include adjustable current source 708 coupled to power source 702 (or, alternatively, coupled to an output of filter 706). Adjustable current source 708 may provide an output current based on a power seen at an input of the adjustable current source (e.g., based on a power output of power source 702 or based on a power output of filter 706). Adjustable current source 708 may generate an output power that may be provided to the power input 704 of the at least one fan. In other words, adjustable current source 708 may provide, at the output of the fan noise compression circuit, an output voltage and an output current based on the output power of the power source. The adjustable current source 708 may be a LT3741 CC/CV control circuit (shown in FIG. 8). The LT3741 may be a buck derived power supply, in which case the adjustable current source 708 may step down the voltage seen at the input of the adjustable current source 708 to a lower voltage seen at the output (e.g., from 12 V to 8.5 V). The fan noise suppression circuit may include a delay element 710 (e.g., a capacitor) coupled to the output of the adjustable current source 708. The delay element 710 may be operable to provide a delay in operation of feedback controller 712. Note that while delay element 710 may provide delay, integration of the feedback, as described below, may be the primary source of delay.

The fan noise suppression circuit may include a feedback loop (e.g., a feedback controller 712 coupled to the output of the adjustable current source). The feedback loop may be configured to allow voltage transients at an output of the fan noise suppression circuit. In other words, the feedback controller 712 may be configured to compare the output of the adjustable current source 708 to a reference voltage and to provide an error value to the adjustable current source 708. The adjustable current source 708 may be configured to adjust the output current based on the received error value. The feedback controller 712 may be configured to maintain the output current of the adjustable current source 708 at a substantially constant value. Thus, the power input 704 of the at least one fan may draw a substantially constant current and power. In other words, the feedback loop may be configured to maintain the output current of the adjustable current source within a specified percentage of a nominal current value. Note that "drawing a constant current" indicates that the value of the current drawn does not deviate from a nominal current value by more than a specified percentage (e.g., 0.5%, 1%, 2%, 5%, etc.). In other words, "constant current" means that the current is devoid of current spikes (or transients) or a sudden increase or decrease from a specified or desired value. The at least one fan may be configured to be powered by the output current provided by the adjustable current source. The feedback loop may have a frequency that is less than a frequency of the at least one fan. The feedback controller 712 may include a proportional integral derivative (PID) controller. The fan noise suppression circuit may be configured to maintain an inductance within a first range during an output voltage transient and within a second range when the output voltage is at steady state, wherein values within the first range are smaller than values within the second range. In other words, the fan noise suppression circuit may be configured to maintain an inductance within a first range during an output voltage transient and within a second range when the output voltage is at steady state, wherein values within the first range are smaller than values within the second range. That is, the fan noise suppression circuit may be configured to provide an inductance having a first inductance value within a first range during an output voltage transient and having a second inductance value within a second range during a steady state output voltage. The values within the first range may be smaller than values within the second range. The inductance of the fan noise suppression circuit may be adjusted via the feedback loop.

The fan noise suppression circuit may include a regulator, such as a boost regulator, a buck regulator, or a boost buck regulator depending on the requirements of the output. Note that a regulator may not be required in the fan noise suppression circuit. Boost regulator 714 is shown by way of example in FIG. 7. The boost regulator 714 may be coupled to the output of the adjustable current source 708. The boost regulator 714 may be configured to increase a voltage at the power input 704 of the at least one fan to meet the voltage required by the fan load (e.g., +12 V at the fan). Note that the boost regulator 714 may help reduce the voltage ripple seen by the fan. The boost regulator 714 may thus allow a higher peak to peak voltage ripple to be seen at delay element 710. In other words, the boost regulator 714 may allow a smaller delay element (e.g., a smaller capacitor) to be used. Note that a boost regulator 714 may not be required according to some embodiments. That is, if the input voltage at variable current source 708 is higher than the required output voltage, then a boost regulator 714 may not be needed to increase the voltage after the voltage has been stepped down by the variable current source 708. Similarly, a boost regulator 714 may not be needed if the adjustable current source 708 is implemented with a boost topology.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system, comprising:
at least one fan, wherein the at least one fan comprises a power input for receiving power from a power source; and
a fan noise suppression circuit coupled between the power source and the power input of the at least one fan, wherein the fan noise suppression circuit is configured to provide power to the at least one fan from at least the power source, wherein in providing power to the at least one fan, the fan noise suppression circuit is configured to:
provide an inductance having a first inductance value within a first range during an output voltage transient and having a second inductance value within a second range during a steady state output voltage, wherein values within the first range are smaller than values within the second range;
draw constant current from the power source; and
provide constant average power to the at least one fan.

2. The system of claim 1, wherein the fan noise suppression circuit comprises:
a feedback loop configured to allow voltage transients at an output of the fan noise suppression circuit.

3. The system of claim 2, wherein the feedback loop includes a proportional integral derivative (PID) controller.

4. The system of claim 2, wherein the fan noise suppression circuit comprises an adjustable current source coupled to the power source, wherein the adjustable current source provides, at the output of the fan noise suppression circuit, an output voltage and an output current based on an output power of the power source.

5. The system of claim 4, wherein the feedback loop is configured to compare the output voltage of the adjustable current source to a reference voltage and provide an error value to the adjustable current source.

6. The system of claim 5, wherein the adjustable current source is configured to adjust the output current based on the received error value.

7. The system of claim 4, wherein the feedback loop is configured to maintain the output current of the adjustable current source within a specified percentage of a nominal current value, wherein the at least one fan is configured to be powered by the output current provided by the adjustable current source.

8. The system of claim 2, wherein the fan noise compression circuit comprises a delay element which is configured to introduce a delay in operation of the feedback loop.

9. The system of claim 8, wherein the delay element comprises a capacitor.

10. The system of claim 2, wherein a frequency of the feedback loop is less than a frequency of the at least one fan.

11. The system of claim 1, wherein the fan noise suppression circuit comprises a filter coupled to the power source and configured to reduce ripple noise originating from the power source.

12. The system of claim 11, wherein the filter comprises an LC filter.

13. The system of claim 1, wherein the fan noise suppression circuit comprises a boost regulator coupled to the power input of the at least one fan, wherein the boost regulator is configured to increase a voltage at the power input of the at least one fan.

14. A fan noise suppression circuit for reducing contamination of a power source caused by a rotating fan, wherein the fan noise suppression circuit is configured to provide power to the rotating fan from at least the power source, wherein the fan noise suppression circuit comprises an adjustable current source and a feedback loop coupled to the adjustable current source, wherein an inductance of the fan noise suppression circuit has a first value that is larger when the rotating fan operates during a steady state output voltage and has a second value that is smaller when the rotating fan during an output voltage transient, and wherein in providing power to the rotating fan, the fan noise suppression circuit is configured to:
draw constant current from the power source; and
provide constant average power to the at least one fan.

15. The fan noise suppression circuit of claim 14, wherein the adjustable current source comprises a buck derived power supply.

16. The fan noise suppression circuit of claim 14, wherein the inductance of the fan noise suppression circuit is adjusted via the feedback loop.

17. A method for reducing voltage noise in a power source caused by at least one fan, wherein the method comprises:
drawing, by an adjustable current source of a fan noise suppression circuit, a constant current from a power source;
providing, by a feedback loop of the fan noise suppression circuit, an error value to the adjustable current source, wherein the error value is based on a comparison of an output voltage of the adjustable current source to a reference voltage; and
adjusting, by the adjustable current source, an output current of the adjustable current source based on the error value, wherein the adjusting the output current provides a constant average power to at least one fan, wherein in providing power to the at least one fan, the fan noise suppression circuit is configured to maintain an inductance value within a first range during an output voltage transient and within a second range during a steady state output voltage, wherein values within the first range are smaller than values within the second range.

* * * * *